July 31, 1962    J. DE KONING    3,047,149
SEPARATING OBJECTS ACCORDING TO THEIR SPECIFIC GRAVITY
Filed July 3, 1957    7 Sheets-Sheet 1

Inventor
Jacob De Koning
By Cushman, Darby & Cushman
Attorneys

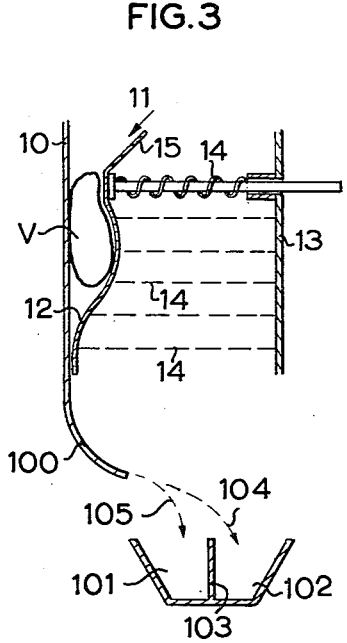
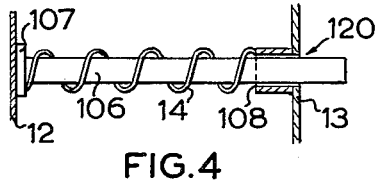
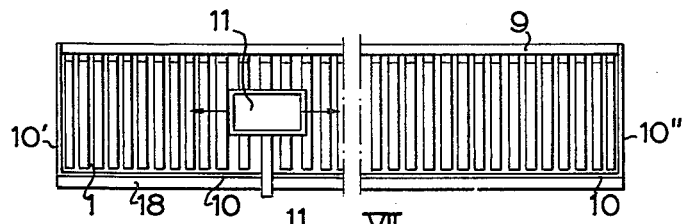
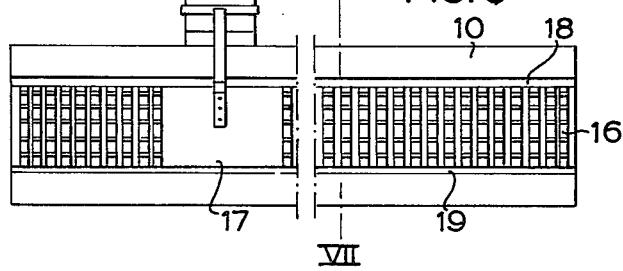

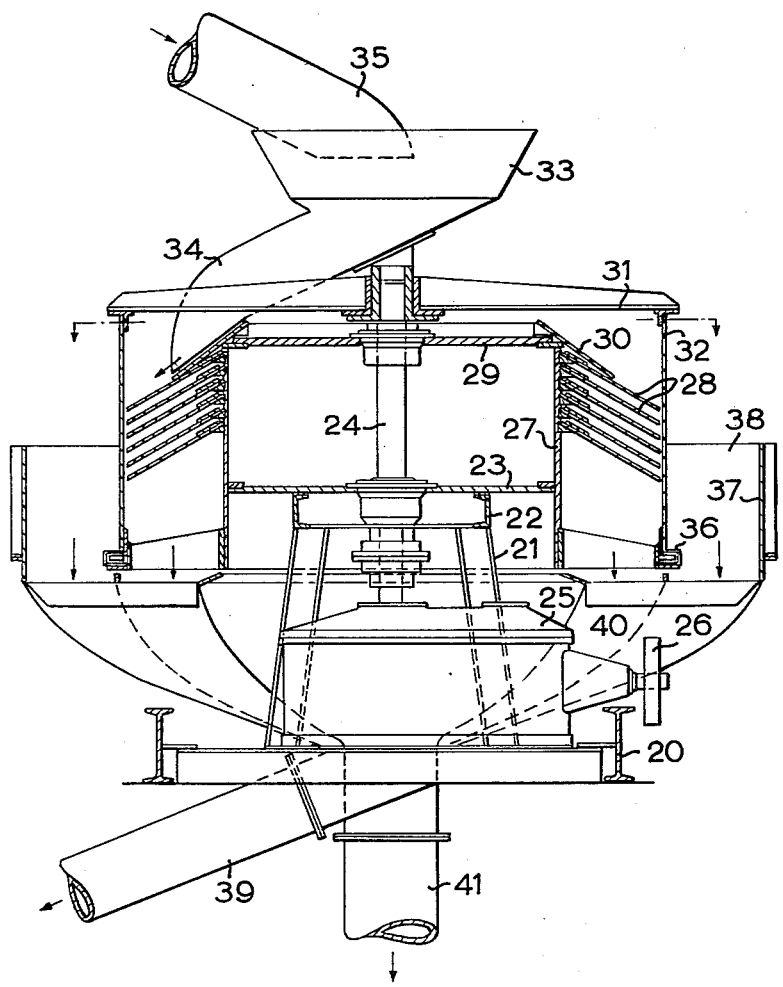

July 31, 1962  J. DE KONING  3,047,149
SEPARATING OBJECTS ACCORDING TO THEIR SPECIFIC GRAVITY
Filed July 3, 1957  7 Sheets-Sheet 4

Inventor
Jacob De Koning
By Cushman, Darby & Cushman
Attorneys

July 31, 1962 — J. DE KONING — 3,047,149
SEPARATING OBJECTS ACCORDING TO THEIR SPECIFIC GRAVITY
Filed July 3, 1957 — 7 Sheets-Sheet 5

Inventor
Jacob De Koning
By Cushman, Darby & Cushman
Attorneys

July 31, 1962 J. DE KONING 3,047,149
SEPARATING OBJECTS ACCORDING TO THEIR SPECIFIC GRAVITY
Filed July 3, 1957
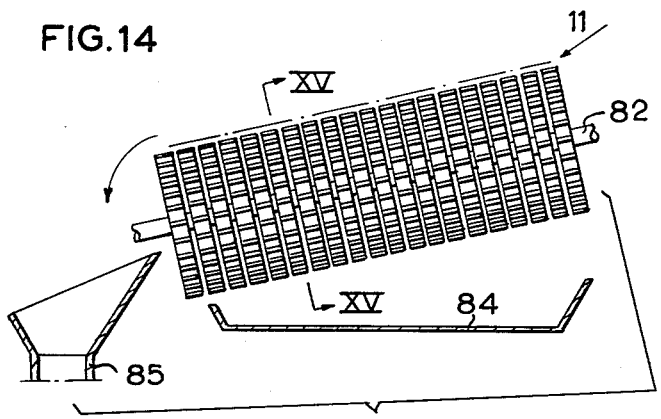
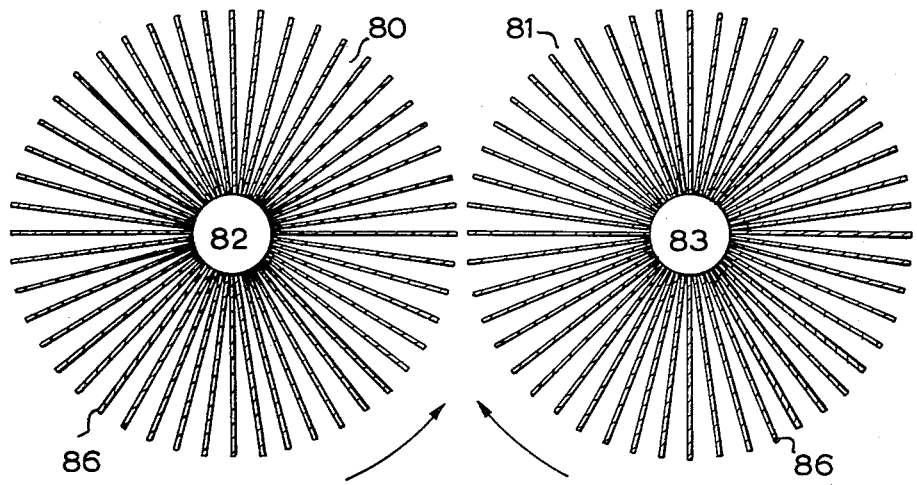
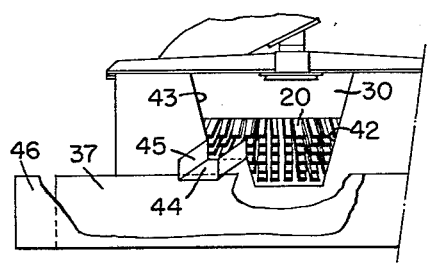

July 31, 1962 J. DE KONING 3,047,149
SEPARATING OBJECTS ACCORDING TO THEIR SPECIFIC GRAVITY
Filed July 3, 1957 7 Sheets-Sheet 7

Inventor
Jacob De Koning
By Cushman, Darby & Cushman
Attorneys

United States Patent Office 3,047,149
Patented July 31, 1962

3,047,149
SEPARATING OBJECTS ACCORDING TO THEIR SPECIFIC GRAVITY
Jacob de Koning, Geleen, Netherlands, assignor to Stamicarbon N.V., Heerlen, Netherlands
Filed July 3, 1957, Ser. No. 669,818
Claims priority, application Netherlands July 11, 1956
14 Claims. (Cl. 209—121)

The present invention relates to a process and an apparatus for separating objects according to their specific gravity, which objects may differ in size. More particularly, the present invention relates to the specific gravity separation of mass products in lump form, as for example stones from potatoes or lump coal into pure coal and shale and/or middlings.

To separate objects according to specific gravity independently of their size and shape, it is essential to compare the mass of the object or a suitable function of the mass with the volume, a suitable function of the volume or another quantity directly correlated with the volume. Normally, use is made of a liquid in which the objects to be separated are immersed. The upward force exerted on the object by the liquid is compared with the weight of the object. Depending on the specific gravity of the liquid compared with the specific gravity of the various objects to be separated, the separation may then be effected by making use of the fact that the one material will float whereas the other will sink or of the difference in settling and rising rates.

In many cases this method is unattractive because large quantities of liquids have to be circulated and regenerated or because it is disadvantageous to wet the objects. This method also consumes much power while the apparatus is exposed to considerable wear.

An object of the present invention is to provide a process and apparatus for separation according to specific gravity, the separation being effected by comparing, by a mechanical method, a force or an amount of kinetic energy which is proportional to the mass of the objects with a force or energy which is substantially proportional to a volumetric quantity depending on the dimensions of the objects, but being independent of the specific gravity of said objects.

Another object of the present invention is to provide a method and apparatus for efficiently and economically separating objects of different specific gravities, size and shape.

These and other objects of the invention will appear more fully in the following specification, claims and drawings in which:

FIGURE 3 is a diagrammatic representation of a vertical longitudinal section through another embodiment.

FIGURE 4 shows a detail of the construction illustrated in FIGURE 3.

FIGURE 5 is a top view of another embodiment.

FIGURE 6 is a front elevation of the embodiment according to FIGURE 5.

FIGURE 7 is a vertical cross-section along the line VII—VII in FIGURE 6.

FIGURE 8 is a vertical longitudinal section through another embodiment.

FIGURE 10a is a view corresponding to FIGURE 10, showing a modified or stepped gate opening.

FIGURE 14 is a diagrammatic representation of another embodiment.

FIGURE 15 is a sectional view of the apparatus shown in FIGURE 14 along the line XV—XV, on a larger scale.

Figure 1:
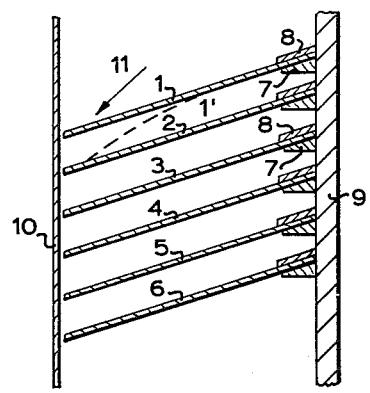
FIGURE 1 is a diagrammatic illustration of an embodiment of the invention.

The force or the energy, which is substantially proportional to a volumetric quantity depending on the dimensions of the object but independent of the specific gravity of the object, may be produced by bringing the object into contact with elements which thereby are put out of equilibrium and owing to this, as well as to their relative displacement, will exert forces of the desired magnitude on the object during or after its movement. When using this method, the object may be moving whereas the elements are stationary, or the elements may be moved along the stationary objects or both the elements and the object may be moving.

Thus it can be achieved that objects differing in specific gravity will behave differently. Objects of lowest specific gravity, for example, will be slowed down more than those of higher specific gravity, or the objects of lower specific gravity will be arrested or pushed away by the elements whereas objects of higher specific gravity are allowed to pass.

In separating objects which differ only slightly in specific gravity, whereas their size and shape may differ considerably, it will of course be essential that the force or energy correlated with the said volumetric quantity be as much as possible proportional to the volume.

The elements, or combination of elements, used in the invention may be, for example, springs or spring-loaded elements or combinations of such elements.

Preferably the elements mentioned have one free end along which the objects travel. Consequently, the free end is displaced, with the result that a spring tension or some other counteracting force is produced. This may be achieved by using means coacting with the elements. These may be a conducting member, such as a flat wall along which the objects travel while deflecting the free ends of the elements, or, for example, a conveyor belt by which the objects are carried along the elements, or a vibrating plate which imparts a forward movement to the objects.

The means coacting with the element or combination of elements may also consist of an identical element or combination of elements arranged symmetrical with respect to the former.

The wall and/or the element or combination of elements may be stationary. Another possibility, however, is to make them movable in relation to each other or even to make both of them movable in relation to for example the feed means.

Generally, the feed means should be so designed that the objects to be separated will move along the same element at such intervals that they will not hinder each other during their relative movement with respect to the element or elements.

Preferably, the feed means will be movable with respect to the elements which are combined into one group, so that two successively supplied objects will not get into contact with the same element.

The design of the elements, the possible collaboration between them, or the collaboration between them and other means as a result of which the objects to be separated are subjected to forces which are proportional to a volumetric quantity depending on the dimensions of the object, as well as the method of comparing the forces with the forces or the energy which are proportional to the mass of the objects, may be realized in very different ways.

In one embodiment of the invention the reacting force is produced by making the object describe a movement between a conducting member, e.g., a vertical wall, and an opposite combination of identical resilient elements which may be deflected in a direction perpendicular to the wall and, in the state of rest, practically touch the wall with their free ends. The size of the free ends and the distances between them should be such that if the objects to be separated are brought between the wall and the extremities of the resilient elements, at least a number of springs will be depressed.

The number of springs that will be depressed is, to a first approximation, proportional to the largest dimension of the object perpendicular to the direction of movement of the resilient elements.

From what has been said above it will also be clear that the separation according to specific gravity can only be carried out with a certain degree of accuracy, when the dimensions of the object exceed a given minimum which depends on the dimensions of the elements used and on the distances between them. With regard to the minimum it must be borne in mind that the smallest dimension of the objects to be separated should be at least 2–3 times the distance between two corresponding points on elements located beside or below each other. The greater the dimensions of the object compared with those of the elements of the bed, the greater the accuracy with which the separation can be made.

The elements, or combination of elements, however, may also be so designed that only those objects having a specific gravity higher than the desired specific gravity of separation will continue their movement with respect to the elements and the members coacting therewith, whereas objects of lower specific gravity will be checked by the elements and the wall.

If the objects to be separated are supplied along a vertical path without or at a low initial velocity, it will be possible for an object of high specific gravity to pass through the bed of elements under the influence of its own weight, whereas an object of low specific gravity will be too light to bend all the elements so far down as to be capable of passing all of them. Depending on the construction the object will then either be arrested upon the bed or disappear only partly into the opening between the elements and the wall and be arrested there.

Before the reaction forces produced by the elements have attained their maximum value at which the object would just be able to pass, said forces have already become so great that they can no longer be overcome by the weight.

By supplying the objects to a thick bed of resilient elements at a given uniform velocity it can be achieved that all objects, or the objects having a specific gravity lower than a given specific gravity, are arrested by the bed. The distance to which they will penetrate into the bed will then depend on the specific gravity.

Objects which do not fall through the bed may be discharged by making the wall and the bed constituted by the elements movable with respect to one another and leaving one or several openings in said wall which during said relative movement will move in front of the objects, with the result that the latter will lose their support against the wall and be carried off through the openings.

Referring to the drawings, in the embodiment of FIGURE 1, a number of flat elements indicated by the numerals 1–6, respectively, which may consist for example of spring steel, have been combined to form a group, each spring being clamped at one end between a supporting member 7 and a clamping plate 8 which is pressed against the member 7, for example by means of screws. The members 7 are rigidly connected to a support 9. Opposite the loose ends of the resilient elements there is a wall 10. In this embodiment, where several groups are arranged side by side, every group has been mounted vertically so that the wall 10 is also vertical and the objects to be separated, which are supplied one by one at 11, will move substantially under the influence of the force of gravity. Preferably, the springs are fixed in a sloping position so that every object will slide towards the wall 10 along the upper springs 1. Owing to the weight of an object lying on the end of spring 1, the spring will bend while exerting on the object a vertical reaction force which is proportional to $R \cos \alpha$, where $R$ is the reaction of the spring and $\alpha$ the angle included between the end of the spring and the horizontal. As the spring is bent further down $R$ increases. The angle $\alpha$, however, also increases, so that $\cos \alpha$ will decrease as $\alpha$ increases.

Figure 2:
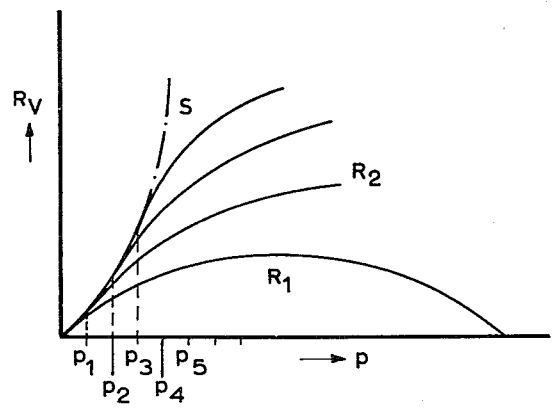
FIGURE 2 is a graphical representation of the reaction forces produced by the coacting elements of FIGURE 1.

The relation between the vertical reaction force $R_v$, i.e., $R \cos \alpha$ and the deflection $p$ of the end of the spring, is approximately given by the line $R_1$ in FIGURE 2. $R_v$ will reach a given maximum and after that decrease to zero. Said zero-value is attained when $\alpha = 90°$, or in other words when the tangent to the end of the spring is vertical. If now the loose end of the spring 1, after being depressed over a distance $p$, touches the element 2, the latter will also be depressed by the vertical force produced by the weight of the object on the element 1, with the result that the vertical reacion $R_2$ produced by element 2 will start coacting with the vertical reaction $R_1$ of the element 1. Several elements 1, 2 and 3 etc. located one below the other will, thus, be enabled to cooperate and thereby produce a total vertical reaction force $R_v$, the maximum value of which can be derived from a curve S which constitutes the tangent to the curves $R_1$, $R_2$, $R_3$ etc.

While an element is bending over a distance $p$, the loose end of the element moves a proportional distance away from the wall 10. When an object, having a given horizontal dimension perpendicular to the wall 10 which dimension will hereinafter be called the thickness of the object, is deposited on the set of springs, it will during its downward travel cause a number of springs located one above the other to cooperate in such a way that the object will be enabled to continue its travel as soon as the loose end of the lowest of a number of coacting springs has moved such a distance away from the wall 10 as is equal to the thickness of the object.

The curve S in FIGURE 2, therefore, also gives the relationship between the horizontal deviations of the springs with respect to the wall 10 and the maximum vertical reaction force of the springs, in other words the relationship between the thickness of the object which is seeking its way between the ends of the springs and the wall 10 and the maximum vertical reaction forces acting on said object. Consequently, when the elements 1, 2 etc. are made of material of a given resilience, the distances may be so adjusted as to ensure that $R_v$ becomes proportional to the square of the thickness of the objects. In the foregoing it has been assumed that the horizontal axis of the objects parallel to the wall 10 is substantially equal to the width of a spring. Objects having a longer horizontal axis parallel to the wall 10, which dimension will hereinafter be called the length of the object, will be carried by more juxtaposed elements than objects having a smaller length. To effect a reasonable separation according to specific gravity, the width of the elements, or the longitudinal dimensions of the objects to be separated, have to be such that every object will be borne by at least a number of juxtaposed elements; in other words, the length of the objects should not be less than 2–3 times the width of the elements.

The maximum value of the reaction force $R_v$, therefore, will be decisive of the degree of deceleration which the objects experience during their movement with respect to the elements.

Whether or not an object will pass all the elements of a group depends upon the proper choice of the number of elements located one above the other, their resilience, the distances between the elements in vertical direction and the distances between the groups of elements in horizontal direction.

In this case an object supplied at 11 and having a specific gravity higher than the specific gravity of separation determined by the elements will, at any rate, move through the space between the ends of the elements 1–6 and the wall 10 and pass the last element 6. Objects having a specific gravity lower than the said specific gravity of separation will be arrested between the wall 10 and the loose ends of the elements 1–6 and may then be discharged through an opening in the wall (see FIGURES 5–10).

Figure 11:
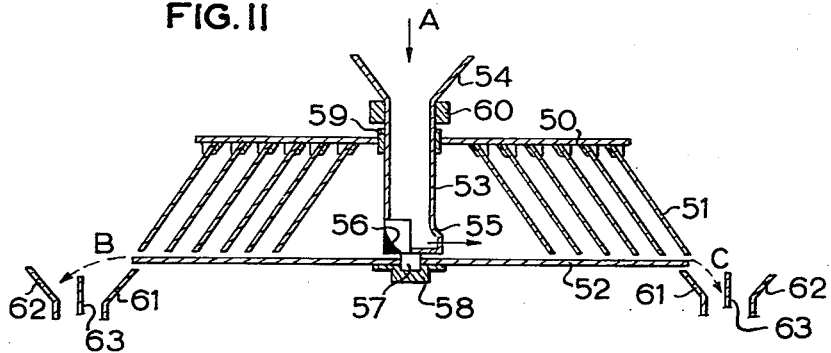
FIGURE 11 is a diagram of a vertical cross-section through another embodiment.

According to another mode of realizing the process, all objects will pass the last element at a rate depending on the specific gravity (see FIGURES 3 and 11).

From a practical point of view, the dimensions of the objects to be handled should not be below a given minimum, the minimum being determined by the dimensions of the resilient elements. The elements ought to have a given degree of stiffness in lateral direction so as to be incapable of twisting or bending sideways, as this would involve the danger that the springs of a group of elements located one above the other no longer exclusively coact with each other but with elements of an adjacent group. Consequently, springs of circular cross-section will be less suitable for attaining the object of the invention. For this reason it is preferred to use flat springs of substantially rectangular cross-section, the horizontal sides of which are a multiple of the vertical sides. It will also be preferred to use springs of equal width to ensure that springs located above one another can coact with overlying and underlying springs, but not with springs of an adjacent group.

It is not essential, however, for the springs of a group to be equally stiff. By using a set of springs whose reaction forces increase in the direction of travel of the objects, it can be achieved that objects differing in specific gravity will be arrested at different levels. When separating raw coal according to specific gravity for example, this will make it possible, for the shale to pass all of the springs whereas the pieces of coal will only pass the weaker, upper springs but be arrested by the stiffer, lower-lying ones, while pieces of timber present in the raw product will already be checked by the upper springs. It will also be possible then to make a separation into clean coal, an intermediate product, for example mixed coal, and shale. The same result may be achieved by gradually decreasing the distances between the springs in the direction of travel of the objects. As the objects are moving further down, more springs will be capable of simultaneously exerting a reaction force on an object or of coacting with a greater number of springs, while in both cases the reaction forces will increase and the objects will be progressively slowed down. Another possibility is to arrange several groups of elements, which have been combined into beds, one below the other, and to make the upper beds separate according to a lower specific gravity than the lower ones.

Figure 18:
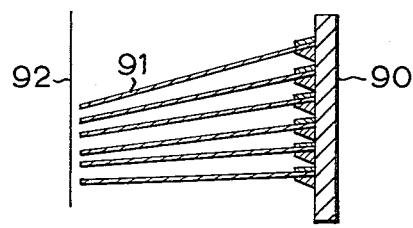
FIGURE 18 is a modification of a group of elements as diagrammatically shown in FIGURE 1.

It may be advantageous to make the distances between the springs adjustable so that the number of coacting springs may be varied with the thickness and height of the objects to be handled and the specific gravity of separation of the bed may be regulated. Nor is it essential for the springs of one group to run parallel to one another. For example, if it is technically impossible to arrange the clamping points of the springs close enough together, the springs may be so fixed as to converge from the clamping points towards the loose ends as shown in FIGURE 18.

In the foregoing it has been assumed that the objects move under the influence of the force of gravity. The same reasoning also holds when the objects are passed through the bed, for example, along a horizontal plane under the influence of the centrifugal force. In that case the term "vertical reactions" as used above should be replaced by "reactions contrary to the direction of travel of the objects."

FIGURES 1 and 2 show how a separation according to specific gravity can be effected by making a number of springs coact with each other in the direction of movement of the objects. Such a separation is also possible, however, when the springs do not coact, so when every springs acts on the object with a component of its own reaction force in a direction contrary to the direction of movement. This condition may occur in handling flat and thin objects which are previously oriented in such a way that their flat sides come to rest against the wall 10, with the result that the free ends of the springs are only slightly deflected. In the case of such a small deflection the component of the reaction force, which tends to decelerate the movement of the object, is substantially proportional to the deflection and consequently proportional to the dimension of the object perpendicular to the wall 10.

When every group comprises a sufficient number of springs the reactions will, therefore, be substantially proportional to the volume of the object so that a separation according to specific gravity may take place.

FIGURE 3 is a diagram of another embodiment of the invention. Here, the elements consist of helical springs 14, which are set substantially perpendicular to the wall and have one end supported against a stationary support, for example against a plate 13 running parallel to the wall 10. The free ends themselves constitute as it were a flexible wall 12 or rest against a wall 12 made of some flexible material. The springs are distributed as regularly as possible over the surface of the wall 10 so that an object V will be "scanned" by as many springs as possible during its travel between the walls 10 and 12. Said springs exert forces on the object, which are directed substantially perpendicular to the wall 10 and proportional to the depression of the springs. The resulting force, which therefore will be substantially proportional to a volumetric quantity depending on the three dimensions of the object, coacts with the wall 10 to exert on the object a frictional force which is directed contrary to the direction of travel and thereby decelerates the movement of the object.

Here again the number of springs and the resilience of the springs may be so selected that only the objects having a specific gravity lower than a predetermined specific gravity of separation will be completely arrested. These objects may then be discharged by an opening in the wall, which may be formed and closed in various ways. Objects of a higher specific gravity, on the other hand, will pass all of the elements. Another embodiment is so constructed that the objects will pass the last element at different velocities depending on their specific gravities and then be separated and collected by making them pass along trajectories the shape of which depends on said velocities.

In FIGURE 3 the wall 10 has therefore been extended by a curved wall 100 under which two troughs 101 and 102, separated by a partition 103, have been arranged. The objects of higher specific gravity which have passed the last element at a higher velocity than the objects of lower specific gravity will continue their course, for example along a projectile trajectory 104 and drop into the trough 102, whereas the objects of lower specific gravity will move along path 105 and drop into trough 101. The place of the partition 103 and its height determine the specific gravity of separation. By making the wall 103 adjustable, the specific gravity of separation may be varied at will.

FIGURE 4 shows a detailed embodiment of a spring used in the construction of FIGURE 3. The helical spring 14 is wound around a cylindrical bar 106, which on one end is provided with a plate 107 which serves as spring seat for spring 14. Plate 107 may be either connected with the wall 12 or simply press against it. Bar 106 can be axially displaced through a sleeve 108 which has been rigidly connected to a supporting member 13 around an opening 120 provided in said supporting member. The opposite end of the spring 14 is supported against the sleeve 108. Thus, it is ensured that the spring 14 can be displaced in one direction only, that is to say substantially perpendicular to the plate 12 and hence also perpendicular to the wall 10.

FIGURES 5–7 show another embodiment of the present invention, FIGURE 5 being a top view, FIGURE 6 a front elevation and FIGURE 7 a cross-sectional view. This embodiment is also mounted in a case constituted by the supporting member 9 and the walls 10, 10′ and 10″, a bed comprising several groups of elements 1–6 etc. arranged parallel to each other. The feed means 11 of this apparatus may be shifted over the bed in a longitudinal direction as indicated by the arrows, so perpendicularly to the elements. The front wall 10 has a rectangular gate 16 extending over the full width thereof and being partly closed by a slide plate 17 which is rigidly connected to the feed means 11 and may be reciprocated between guides 18 and 19. The slide plate 17 has been made so wide as to allow an object of high specific gravity sufficient time to drop so far down along the slide plate as to be capable of passing the lowest element. An object of low specific gravity, however, will be arrested between the ends of the elements and slide plate 17 and will, after the slide plate 17 has moved along, drop across the edge of the gate 16 into a collecting trough (not shown). Another possibility is to keep the feed means 11 and the slide plate 17 stationary and reciprocate the bed plus the wall.

The gate 16 with slide plate 17 described above may also be employed in the apparatus illustrated in FIGURE 3, in which case the extended wall 100 and the collecting troughs 101 and 102 may of course be dispensed with. On the other hand, when using the construction shown in FIGURES 5–7, it is also possible to allow all the objects to pass along the free ends of the elements and to employ a collecting device as described in connection with FIGURE 3.

In the above described embodiments, the wall and the bed are both stationary. It is possible, however, to make either one movable while the other remains stationary.

Figure 9:
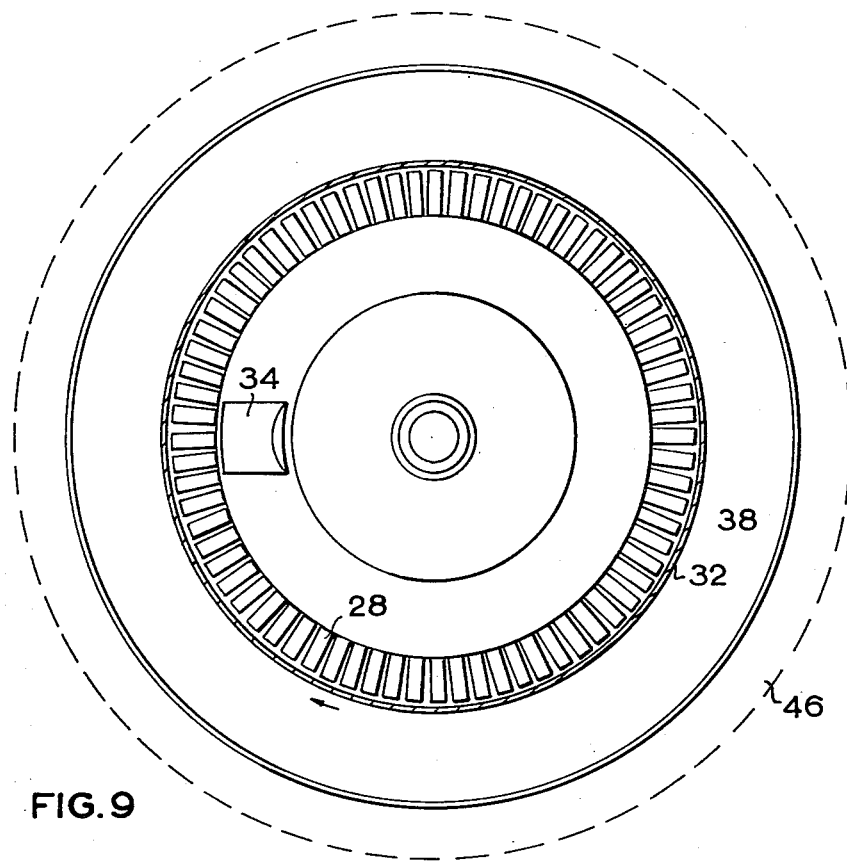
FIGURE 9 is a top view of the embodiment shown in FIGURE 8.
Figure 10:
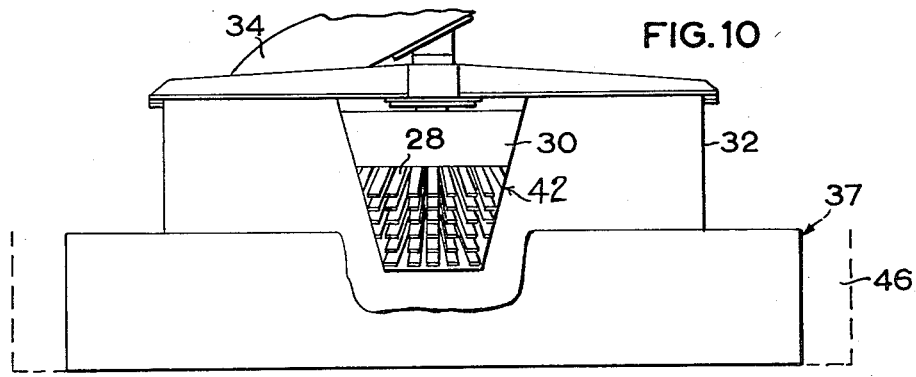
FIGURE 10 is a view of the apparatus according to FIGURE 8 where part of the wall has been omitted.

Such an apparatus, which is preferably employed, can be seen in FIGURES 8–10, FIGURE 8 being a vertical section, FIGURE 9 a top view and FIGURE 10 a front elevation which also shows the partly omitted wall of the discharge trough. Mounted on a frame 20 are supports 21 which carry an annular beam 22 supporting a circular plate 23 with a central opening through which is passed a vertical shaft 24. The shaft 24 is rotated by means of a motor (not shown) by a pulley 26 and a transmission installed in box 25. Mounted on the periphery of plate 23 is a vertical, cylindrical shell 27 to which the groups of resilient elements 28 are fixed in the manner described in connection with FIGURE 1. The elements, therefore, have been set at such an angle to the shell 27 as to form part of cone surfaces and more particularly in such a position that one or more deflecting elements are only capable of coacting with elements in the same group, i.e., the end of a deflecting element cannot get into contact with an element of an adjacent group. Shell 27 is covered by a plate 29 which carries an annular plate 30 having the shape of truncated cone and projecting across the upper parts of the elements, so that the material to be handled is prevented from penetrating into the interior of the shell. Shaft 24 carries a number of rods 31 which are connected to a casing 32 the inner wall of which is in contact with or at a very short distance from the ends of the elements 28. Also connected to the shaft 24 is a feed funnel 33 opening into a feed trough 34 through which the objects supplied through feed trough 35 are successively delivered to different points of the bed constituted by the elements 28. The lower end of casing 32 may be guided on rollers 36. Casing 32 is surrounded by a wall 37 which constitutes the outer wall of trough 38 which has an inclined bottom and opens into a discharge pipe 39 for one of the separated fractions, while underneath the elements 28 there is a trough 40 which opens into a discharge pipe 41 for the other fraction. As shown in FIGURE 10, an opening 42 has been left in the casing 32. The apparatus, which is very suited for separating shale and coal or ore, operates as follows:

The raw material, for example, coal mixed with gangue of 90–150 mm., is supplied through trough 35, delivered into funnel 33 and, owing to the rotating movement thereof, spread out over the bed constituted by the elements 28 via feed trough 34 so that no two pieces will be simultaneously deposited on the same elements. Shale pieces having a specific gravity higher than the predetermined specific gravity of separation depending on the elements, drop down along the deflecting ends of the elements and the wall 32 into trough 40 and are carried away through pipe 41. Pieces of material having a specific gravity lower than the specific gravity of separation, such as coal and timber, are arrested between the ends of the elements and wall 32 which rotates at the same speed as the funnel trough assembly (33 and 34), and remain there until gate 42 is moving past said pieces, when they are enabled to drop into trough 38 and to be carried away through pipe 39.

Consequently it is essential for gate 42 to move in the rear of feed trough 34, as this will allow the pieces of high specific gravity sufficient time to drop down along the wall. The distance between feed trough and gate depends on the speed of rotation and on the falling speed of the pieces of high specific gravity. It is also possible to employ several feed troughs 34, in which case a corresponding number of gates 42 should be left in the wall. Since the raw product frequently contains pieces of timber, it may be desirable to separate the latter from the coal which may be achieved with the same installation after making a minor alteration illustrated in FIGURE 10a.

Since wood has a lower specific gravity than coal, the pieces of timber will be arrested higher up than the pieces of coal. The casing opening 42 may now be provided with an extension 43 on its leading edge, the lower edge of the extension 43 being at a higher level than the lower edge of the opening 42. A downwardly sloping plate 44 provided with vertical side walls 45 extends outwardly from the lower edge of the opening extension 43 to a point beyond the upper edge of wall 37, and delivers the pieces of timber into a trough 46 constructed outside the trough 38.

The installation described above may be varied in numerous ways. By increasing the stiffness of the elements in one group from top to bottom and using a stepped opening 42, 43, as shown in FIGURE 10a, the separation may be made to various specific gravities, which requires the use of a separate collecting trough for each fraction.

Another possibility is to arrange several beds one below the other and treat the material that has passed through the upper bed on the lower one.

Assuming that the performance of the apparatus is such that the shale fraction still contains 6% of coal, an average of 6% of this amount will be left in the shale after said fraction has been passed over a second identical bed, so that the ultimate shale fraction will contain only 0.36% of coal.

Passing the material through two identical beds placed in series has the additional advantage that the first bed may be more heavily loaded. When the mixture to be handled contains 50% of shale and 50% of coal, the second bed receives about half of the total feed so that pieces that have got into the wrong fraction can be easily removed.

Finally, the apparatus may be substantially constructed as shown in FIGURE 3 or FIGURES 5–7 where the bed (beds) and the wall have been mounted stationary with respect to each other, whereas the feed means together with the slide plate coating with the means can be displaced (FIGURES 5–7), or where collecting means have been mounted under the bed for collecting the objects passing along the last element at different velocities (FIGURE 3).

It is not essential for the material to be separated according to specific gravity to have a particle size varying from 90–150 mm.; apparatus of this type fitted with narrower elements may also be successfully used for making a specific gravity separation of fractions of smaller dimensions, for example 50–90 mm.

FIGURE 11 shows a diagram of a vertical section through another embodiment as an apparatus of the present invention.

This apparatus consists of a stationary, horizontal circular plate 50 which serves as support for the groups of plate springs 51 whose ends coact with the stationary horizontal plate 52 which acts as guide member.

Mounted in coaxial relation with the groups of plate springs is a hollow tube 53 the upper end of which opens into a funnel 54 and whose lower end is closed at the bottom but provided with an exit 55 jutting out on the side. Opposite the outlet a guide member 56 has been mounted in the tube. Tube 53 is provided at its lower end with a pivot 57 which rotates in a step bearing 58 mounted on the plate 52 while the upper end of the tube is guided in the plate 50 by means of a sleeve 59. The tube may be rotated in any manner desired. In the embodiment shown in the drawing a sheave 60 has been fitted around the tube which may be driven by a motor and a transmission belt (not shown). Around the periphery of plate 52, two collecting troughs 61 and 62, separated from one another by a partition 63, are provided for collecting the fractions of low and high specific gravity, the position of the upper edge of the partition 63 determining the specific gravity of separation. Here, the force with which the objects strike against the resilient elements, which force is counteracted by those components of the forces produced by the elements and the wall which are directed contrary to the direction in which the objects are travelling, is not the force of gravity but centrifugal force, the centrifugal force being proportional to the mass of the objects.

Objects of higher specific gravity will pass the last element with a higher velocity than objects of lower specific gravity, so that the objects will fall over the edge of plate 52 along paths depending on their specific gravities. Consequently, the specific gravity of separation may be adjusted to the value desired by varying the height of the partition 63.

Instead of using plate springs, other appropriate elements may be employed, for example, the helical springs described in connection with FIGURES 3 and 4. When using group of plate springs, the springs of each group may be arranged in vertical planes tangential to the circle described by the end of outlet 55 in the course of its revolution. As the objects are thrown out at a tangent to said circle, their movement with respect to the groups of springs will be substantially along said planes, with the result that a good separation is obtained.

Figure 12:
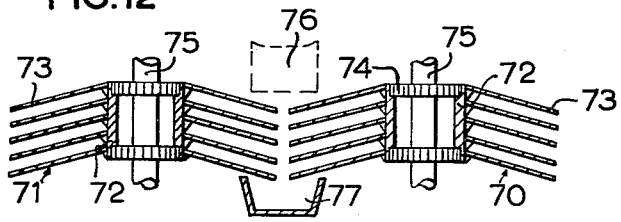
FIGURE 12 is a cross-sectional view of another embodiment along the line XII—XII in FIGURE 13.
Figure 13:
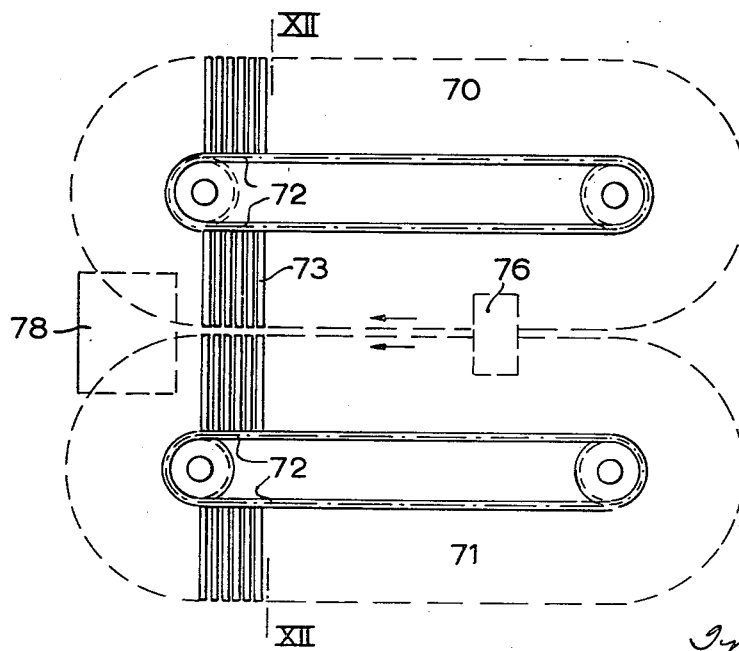
FIGURE 13 is a top view of the apparatus shown in FIGURE 12.

Another embodiment is illustrated in FIGURES 12 and 13. Here, the member coacting with the ends of the elements consists of an identical bed. The apparatus comprises two adjacent beds 70 and 71, each bed being composed of a number of vertical supporting members 72 pivotally connected to one another to form an endless belt and each of which carries a group of elements 73. The endless belts move along toothed pinions 74 keyed to shafts 75 whose direction of rotation is such that the adjacent parts of the beds 70 and 71 are travelling in the same direction. The endless belts are provided on the inside with grooves (not shown) adapted to engage the teeth of the pinions 74. The material is supplied by a feed trough 76 indicated by the broken lines. The objects of high specific gravity will gravitate between the deflecting ends of the elements, to be collected in the discharging trough 77. The objects of low specific gravity will be arrested and carried along by the ends of the elements. Finally, they drop into the collecting hopper 78. Here again, several identical beds, or beds of increasing stiffness, may be arranged one below the other in the manner described above.

In the embodiment shown in FIGURES 14 and 15, elements 86, which may consist of springs, are fixed on one side on two parallel shafts 82 and 83 which are set at one angle to the horizontal. The shafts 82 and 83 have been set so far apart that the free ends of the elements in the two sets substantially touch one another in the plane passing through the centerlines of the shafts. The shafts are preferably rotated at equal velocities. The objects supplied near the highest point of the two sets, at 11, are separated according to specific gravity in that the objects of higher specific gravity keep moving down through the passage formed between the elements, while depressing the free ends of the elements 86, and ultimately drop into the collecting device 84 for said objects arranged below the sets. Objects of lower specific gravity are arrested by the elements 86 and ultimately delivered into the collecting device 85 disposed under the lowest point of the two sets. Consequently, the installation resembles two rotating brushes 80 and 81, the resilient elements of which may even consist of rods of circular cross-section.

Figure 16:
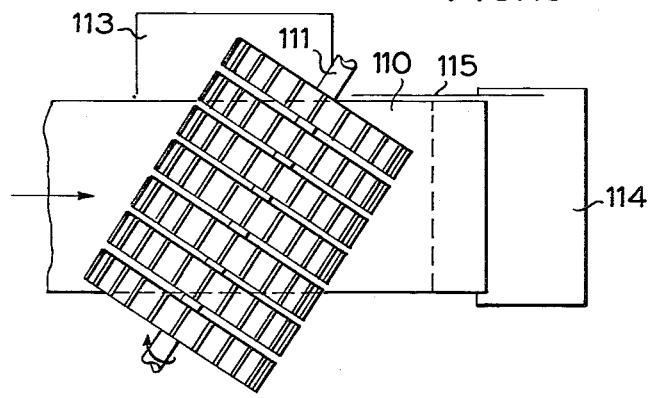
FIGURE 16 is a diagrammatic top view of another embodiment.
Figure 17:
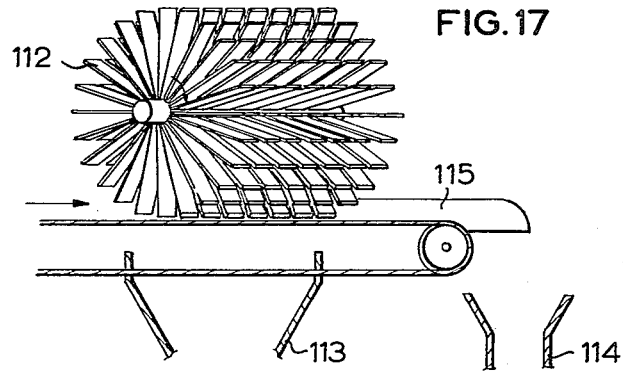
FIGURE 17 is a side view of the device shown in FIGURE 16.

FIGURES 16 and 17 show a diagrammatic view of a construction to which the objects are supplied one by one along a belt conveyor 110. The resilient elements 112 are connected on one end to the rotating shaft 111. Said shaft 111 is mounted parallel to the belt conveyor 110 at an angle to the longitudinal axis thereof in such a way that the free ends of the resilient elements 12 touch the belt or reach to within a very short distance from said belt. The rotating elements push the lighter objects, for which only a small frictional force has to be overcome, into the collecting device 113 beside the belt conveyor 110, whereas the forces exerted by said elements do not suffice for overcoming the frictional forces of the objects of higher specific gravity. The latter remain on the belt 110 and are delivered into a collecting device 114 disposed under the return end pf the belt. If desired, a guide wall 115 may be provided along the belt 110 to prevent objects of a specific gravity approximately equal to the specific gravity of separation from falling from the belt. Here again, the combination of resilient elements may consist of a brush with resilient projections.

FIGURE 18 illustrates an alternative mounting for the blade springs in apparatus of the kinds described with reference to FIG. 1, FIGS. 5 to 7, and FIGS. 8 to 10. The blades 91 are mounted on a carrier wall 90 so that they converge in the direction of the cooperating guide wall 92. For a given narrow spacing of the free ends of the springs this convergence gives more space for the blade clamping means.

The terminology used in the specification is for the purpose of description and not limitation, the scope of the invention being defined in the claims.

I claim:

1. An apparatus for separating objects in accordance with their specific gravity comprising, means for delivering the objects to be separated along a path independently of one another, retarding means including a group of resilient cantilever elements positioned one behind another each with a free end disposed in the path of objects to be separated, coacting means disposed adjacent the free end of each element to define a path therebetween for objects while they are moving independently in succession with respect to the elements, the free ends of each of the elements of each group being positioned to deflect from a normal state of equilibrium when engaged by an object, said elements developing reactive forces on each of the objects when moved out of their state of equilibrium, the spacing between said free ends not exceeding about half the smallest dimension of said objects whereby the resultant forces developed on each of the objects are increased to a maximum substantially proportional to a volumetric quantity determined by the dimensions of the objects for separately controlling the movement of each object with respect to the group of elements in accordance with the specific gravity of the objects, and means cooperating with the group of elements for collecting the objects separately in accordance with their movement with respect to the group of elements.

2. An apparatus of the character described in claim 1 wherein said elements are so positioned with respect to each other that the reactive forces of each of the elements is cumulatively applied to the objects.

3. An apparatus for separating objects in accordance with their specific gravity comprising, means for delivering the objects to be separated along a path independently of one another, retarding means including a first group of resilient cantilever elements positioned one behind another each with a free end disposed in the path of objects to be separated, and at least a second group of similar resilient cantilever elements positioned one behind the other each with a free end disposed in the path of objects to be separated, relating elements of each group being in juxtaposition with respect to each other, coacting means disposed adjacent the free end of each element to define a path therebetween for objects while they are moving independently in succession with respect to the elements of at least one of the groups, the free ends of each of the elements of each group being positioned to deflect from a normal state of equilibrium when engaged by an object, said elements developing reactive forces on each of the objects when moved out of their state of equilibrium, the resultant forces developed on each of the objects being increased to a maximum substantially proportional to a volumetric quantity determined by the dimensions for separately controlling the objects movement of each object with respect to the group of elements in accordance with the specific gravity of the objects, and means cooperating with the groups of elements for collecting the objects separately in accordance with their movement with respect to a particular group of the groups of elements.

4. An apparatus of the character described in claim 3 wherein elements belonging to the same group deflect upon impact with objects and coact with one another so that a maximum resultant of their reaction forces is proportional to a square of the dimension of the object measured in a direction perpendicular to the direction in which the objects are traveling.

5. An apparatus of the character described in claim 3 wherein said means coacting with the groups of elements includes a wall spaced from the free ends of said elements.

6. An apparatus of the character described in claim 3 wherein said means coacting with the groups of elements includes related groups of cantilever resilient elements each having free ends positioned adjacent and aligned with the free ends of said first-mentioned groups.

7. An apparatus of the character described in claim 3 wherein said means for delivering objects is movable with respect to said groups of elements so that objects are successively delivered to successive groups of elements.

8. An apparatus of the character described in claim 3 wherein said groups of elements have a shape of a body of revolution with a vertical axis of revolution, and wherein said means coacting with the elements of said groups of elements is a concentric wall about the free ends of said elements.

9. An apparatus of the character described in claim 8 wherein said wall is rotatable with respect to said groups of elements, and said wall is provided with at least one gate enabling a passage of objects of a specific gravity lower than the specific gravity of separation, said gate being to the rear of said object delivery means.

10. An apparatus of the character described in claim 8 wherein said wall is provided with a plurality of gates at various heights whereby objects separated by said elements may be carried off separately.

11. An apparatus of the character described in claim 3 wherein said coacting means is a horizontal circular wall and said delivery means is a substantially vertical hollow body having a radial opening disposed immediately above the upper surface of the wall, said hollow body being adapted to rotate on a vertical axis, said groups of elements each comprising a plurality of cantilever resilient members having free ends terminating adjacent the upper surface of the wall, the other ends of each group of elements terminating in a plane substantially parallel to the wall, and said collecting means comprising two concentric troughs disposed around the periphery of the wall and separated from one another by a partition having a vertical height which determines a specific gravity of separation.

12. In an apparatus for separating objects according to their specific gravity, means for delivering objects to be separated independently of one another, a pair of parallel rotating shafts set at an angle to the horizontal, a plurality of groups of elements on each of said shafts, the groups being spaced longitudinally of the shafts, the elements of each group including spring-like members radiating from the shafts, the elements of one of the groups on one of said shafts having their free ends cooperating with the related free ends of the elements of one of the groups on the other of said shafts, said elements of said groups being adapted to engage objects delivered thereto, the objects moving the elements out of their normal state of equilibrium whereby the elements develop forces on the objects proportional to the volumetric quantity determined by the dimensions of the objects so as to vary movement of the objects with respect to the elements, and collecting means for the separated objects, said collecting means including means to collect objects of low specific gravity at the lowest point of the coacting groups of elements on said shafts.

13. In an apparatus for separating objects in accordance with their specific gravity, means for delivering the objects to be separated independently of one another, a plurality of groups of elements horizontally positioned with respect to each other, each of the groups of elements comprising a plurality of resilient cantilever elements vertically disposed with one another, said groups of elements being movable with respect to said delivery means so that objects are successively delivered to successive groups, a flat plate element mounted in a substantially vertical position adjacent the free ends of the elements of said groups, said flat plate element being movable horizontally with respect to the groups of elements, means to move said flat plate element together with said delivery means whereby objects delivered to groups of elements are prevented from falling off the free ends of the elements until such time that they have moved on account of their specific gravity a vertical distance with respect to a group of the elements.

14. In an apparatus for separating objects according to specific gravity a first separating set, comprising an endless belt movable about two pulleys each of them being rotatable about a vertical shaft, said belt carrying a plurality of juxtaposed groups of cantilever resilient elements, the elements of each group being disposed vertically the one below the other, a second identical set of belt with groups of cantilever resilient elements, disposed symmetrically to the first mentioned set relative to a vertical plane parallel to the said vertical shafts, and spaced apart a short distance from the free ends of the elements of the said first set, means for rotating said shafts in said first set and in said second set in opposite directions for the two sets adjacent the plane of symmetry to move in the same direction, means for delivering objects to be separated independently of one another substantially in the region of said plane of symmetry and on the top of the uppermost elements of cooperating groups of elements of the two sets, each of the opposing groups of said separating sets defining a path for objects while they are moving with respect to the elements, the element of opposing groups applying forces to objects in proportion with a volumetric quantity determined by the dimensions of the objects, and means for collecting objects of different specific gravity separated by the opposing groups, said means including means at one end of said pair of endless belts for collecting objects having a lower specific gravity than a desired specific gravity of separation.

References Cited in the file of this patent

UNITED STATES PATENTS

| | | |
|---|---|---|
| 977,956 | Langerfeld | Dec. 6, 1910 |
| 1,132,011 | Horst | Mar. 16, 1915 |
| 2,657,798 | Young | Nov. 3, 1953 |
| 2,726,501 | Raney et al. | Dec. 13, 1955 |
| 2,781,127 | Becker | Feb. 12, 1957 |
| 2,828,012 | Komuchar | Mar. 25, 1958 |

FOREIGN PATENTS

| | | |
|---|---|---|
| 156,043 | Switzerland | Oct. 1, 1932 |